(12) United States Patent
Robinson et al.

(10) Patent No.: US 7,774,228 B2
(45) Date of Patent: Aug. 10, 2010

(54) TRANSFERRING TOLL DATA FROM A THIRD PARTY OPERATED TRANSPORT TO A USER ACCOUNT

(75) Inventors: Benjamin P. Robinson, Plano, TX (US); Sarath K. Balachandran, Irving, TX (US)

(73) Assignee: Rent A Toll, Ltd, Carrollton, TX (US)

( * ) Notice: Subject to any disclaimer, the term of this patent is extended or adjusted under 35 U.S.C. 154(b) by 717 days.

(21) Appl. No.: 11/640,586

(22) Filed: Dec. 18, 2006

(65) Prior Publication Data
US 2008/0147491 A1 Jun. 19, 2008

(51) Int. Cl.
*G06Q 99/00* (2006.01)
(52) U.S. Cl. .................. 705/13; 705/5; 705/6; 340/5.2; 340/901
(58) Field of Classification Search .............. 705/5, 705/6, 13; 340/5.2, 901, 501
See application file for complete search history.

(56) References Cited

U.S. PATENT DOCUMENTS

| | | | |
|---|---|---|---|
| 4,510,495 A | 4/1985 | Sigrimis et al. | |
| 4,546,241 A | 10/1985 | Walton | |
| 4,665,395 A | 5/1987 | Van Ness | |
| 5,086,389 A | 2/1992 | Hassett et al. | |
| 5,310,999 A | 5/1994 | Claus et al. | |
| 5,396,417 A | 3/1995 | Burks et al. | |
| 5,525,991 A | 6/1996 | Nagura et al. | |
| 5,602,919 A | 2/1997 | Hurta | |
| 5,805,209 A | 9/1998 | Yuge et al. | |
| 5,809,480 A | 9/1998 | Chasek | |
| 5,819,234 A | 10/1998 | Slavin et al. | |
| 5,935,190 A | 8/1999 | Davis et al. | |
| 5,948,038 A | 9/1999 | Daly | |
| 5,991,749 A | 11/1999 | Morrill, Jr. | |
| 6,052,068 A | 4/2000 | Price et al. | |
| 6,087,963 A | 7/2000 | Kobayashi et al. | |
| 6,111,523 A | 8/2000 | Mee | |
| 6,175,800 B1 | 1/2001 | Mori et al. | |
| 6,181,259 B1 | 1/2001 | Yamashita | |
| 6,191,705 B1 | 2/2001 | Oomen et al. | |
| 6,195,019 B1 | 2/2001 | Nagura | |
| 6,198,913 B1 | 3/2001 | Sung et al. | |

(Continued)

FOREIGN PATENT DOCUMENTS

EP 0784297 A2 7/1997

(Continued)

OTHER PUBLICATIONS

Mehmood, Jennifer, "International Search Report for PCT/US2007/011816" as mailed Jun. 2, 2008 (3 pages).

(Continued)

*Primary Examiner*—Akiba K Robinson Boyce
(74) *Attorney, Agent, or Firm*—Winstead PC

(57) ABSTRACT

A system, method, and computer readable medium for transferring toll data from a third party operated transport to a user account comprises, performing a verification of the user account, receiving a service request to transfer tolls incurred by the third party operated transport, receiving toll data, and sending information related to the user account if the toll data and the service request match.

22 Claims, 10 Drawing Sheets

U.S. PATENT DOCUMENTS

| | | |
|---|---|---|
| 6,198,987 B1 | 3/2001 | Park et al. |
| 6,218,963 B1 | 4/2001 | Kawanabe et al. |
| 6,233,519 B1 | 5/2001 | Yamada |
| 6,243,029 B1 | 6/2001 | Tomer |
| 6,252,523 B1 | 6/2001 | Mostrom |
| 6,252,524 B1 | 6/2001 | Takikita |
| 6,275,552 B1 | 8/2001 | Ando |
| 6,278,935 B1 | 8/2001 | Kaplan et al. |
| 6,285,858 B1 | 9/2001 | Yoshida |
| 6,300,882 B1 | 10/2001 | Inoue |
| 6,308,893 B1 | 10/2001 | Waxelbaum et al. |
| 6,326,900 B2 | 12/2001 | DeLine et al. |
| 6,337,639 B1 | 1/2002 | Kojima |
| 6,340,934 B1 | 1/2002 | Hisada |
| 6,342,844 B1 | 1/2002 | Rozin |
| 6,344,806 B1 | 2/2002 | Katz |
| 6,347,739 B1 | 2/2002 | Tamam |
| 6,373,402 B1 | 4/2002 | Mee |
| 6,388,579 B1 | 5/2002 | Adcox et al. |
| 6,390,365 B1 | 5/2002 | Karasawa |
| 6,390,429 B1 | 5/2002 | Brincat |
| 6,396,418 B2 | 5/2002 | Naito |
| 6,411,889 B1 | 6/2002 | Mizunuma et al. |
| 6,437,706 B2 | 8/2002 | Sato et al. |
| 6,446,049 B1 | 9/2002 | Janning et al. |
| 6,449,555 B1 | 9/2002 | Ohba et al. |
| 6,459,385 B2 | 10/2002 | Yamashita |
| 6,463,384 B1 | 10/2002 | Kaplan et al. |
| 6,490,443 B1 | 12/2002 | Freeny, Jr. |
| 6,509,843 B1 | 1/2003 | Fuyama |
| 6,538,580 B2 | 3/2003 | Bostrom et al. |
| 6,542,815 B1 | 4/2003 | Ishizaki et al. |
| 6,603,406 B2 | 8/2003 | Jambhekar |
| 6,642,851 B2 | 11/2003 | Deline et al. |
| 6,653,946 B1 | 11/2003 | Hassett |
| 6,658,392 B2 | 12/2003 | Yoshida |
| 6,658,775 B1 | 12/2003 | Lanzisero |
| 6,661,352 B2 | 12/2003 | Tiernay et al. |
| 6,683,580 B2 | 1/2004 | Kuramoto |
| 6,683,956 B1 | 1/2004 | Aikawa et al. |
| 6,684,155 B1 | 1/2004 | Chen et al. |
| 6,705,521 B1 | 3/2004 | Wu et al. |
| 6,725,202 B1 | 4/2004 | Hurta et al. |
| 6,737,986 B2 | 5/2004 | Fuyama |
| 6,744,377 B1 | 6/2004 | Inoue |
| 6,756,915 B2 | 6/2004 | Choi |
| 6,774,810 B2 | 8/2004 | Deline |
| 6,791,475 B2 | 9/2004 | Yamashita |
| 6,796,499 B1 | 9/2004 | Wang |
| 6,816,707 B1 | 11/2004 | Barker et al. |
| 6,834,267 B1 | 12/2004 | Fuyama |
| 6,856,820 B1 | 2/2005 | Kolls |
| 6,883,710 B2 | 4/2005 | Chung |
| 6,909,876 B2 | 6/2005 | Higashino et al. |
| 6,920,379 B2 | 7/2005 | Miyamoto |
| 6,937,162 B2 | 8/2005 | Tokitsu et al. |
| 7,053,793 B2 | 5/2006 | Tajima et al. |
| 7,104,447 B1 | 9/2006 | Lopez et al. |
| 2001/0019307 A1 | 9/2001 | Sato et al. |
| 2001/0025251 A1 | 9/2001 | Konishi et al. |
| 2001/0026228 A1 | 10/2001 | Naito |
| 2001/0052880 A1 | 12/2001 | Kuramoto |
| 2002/0002534 A1 | 1/2002 | Davis et al. |
| 2002/0004741 A1 | 1/2002 | Yoshida |
| 2002/0008638 A1 | 1/2002 | Yamashita |
| 2002/0018005 A1 | 2/2002 | Fuyama |
| 2002/0032506 A1 | 3/2002 | Tokitsu et al. |
| 2002/0046128 A1 | 4/2002 | Abe et al. |
| 2002/0052837 A1 | 5/2002 | Bouthors |
| 2002/0067291 A1 | 6/2002 | Ikeda |
| 2002/0072963 A1 | 6/2002 | Jonge |
| 2002/0080048 A1 | 6/2002 | Choi |
| 2002/0089431 A1 | 7/2002 | Fuyama |
| 2002/0097178 A1* | 7/2002 | Thomas et al. ................ 342/47 |
| 2002/0105440 A1 | 8/2002 | Bostrom et al. |
| 2002/0111851 A1 | 8/2002 | Folkers |
| 2002/0115410 A1 | 8/2002 | Higashino et al. |
| 2002/0145039 A1 | 10/2002 | Carroll |
| 2002/0145542 A1 | 10/2002 | Yamashita |
| 2002/0178050 A1 | 11/2002 | Sone |
| 2002/0186144 A1* | 12/2002 | Meunier ................ 340/825.28 |
| 2002/0194137 A1 | 12/2002 | Park et al. |
| 2002/0198767 A1 | 12/2002 | Kim |
| 2003/0001755 A1 | 1/2003 | Tiernay et al. |
| 2003/0026430 A1 | 2/2003 | Aikawa et al. |
| 2003/0033083 A1 | 2/2003 | Nakashima et al. |
| 2003/0046145 A1 | 3/2003 | Miao |
| 2003/0050038 A1 | 3/2003 | Haave et al. |
| 2003/0067396 A1 | 4/2003 | Hassett |
| 2003/0069784 A1 | 4/2003 | Banerjee et al. |
| 2003/0105662 A1 | 6/2003 | Koketsu et al. |
| 2003/0109223 A1 | 6/2003 | Toyama |
| 2003/0110075 A1 | 6/2003 | Shioda et al. |
| 2003/0112125 A1 | 6/2003 | Saegrov |
| 2003/0115095 A1 | 6/2003 | Yamauchi |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |
| 2004/0019412 A1 | 1/2004 | Miyamoto |
| 2004/0046019 A1 | 3/2004 | Kojima |
| 2004/0083130 A1 | 4/2004 | Posner et al. |
| 2004/0153401 A1 | 8/2004 | Gila et al. |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz, Jr. |
| 2005/0071175 A1 | 3/2005 | Gila et al. |
| 2005/0097018 A1 | 5/2005 | Takida |
| 2005/0102211 A1 | 5/2005 | Freeny |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |
| 2005/0169228 A1 | 8/2005 | Dowling |
| 2005/0170824 A1 | 8/2005 | Dowling |
| 2005/0170825 A1 | 8/2005 | Dowling |
| 2005/0179522 A1 | 8/2005 | Saegrov |
| 2005/0187701 A1 | 8/2005 | Baney |
| 2005/0195841 A1 | 9/2005 | Dowling |
| 2005/0195842 A1 | 9/2005 | Dowling |
| 2005/0197976 A1 | 9/2005 | Tuton et al. |
| 2005/0198199 A1 | 9/2005 | Dowling |
| 2005/0216187 A1 | 9/2005 | Hartinger |
| 2005/0270178 A1 | 12/2005 | Ioli |
| 2005/0279831 A1* | 12/2005 | Robinson et al. ............ 235/384 |
| 2006/0143104 A1 | 6/2006 | Wagonheim |
| 2006/0237528 A1 | 10/2006 | Bishop et al. |
| 2007/0026842 A1 | 2/2007 | Haave et al. |
| 2007/0124197 A1 | 5/2007 | Robinson et al. |
| 2007/0124198 A1 | 5/2007 | Robinson et al. |

| | | | |
|---|---|---|---|
| 2007/0124199 A1 | 5/2007 | Robinson et al. | |
| 2007/0192177 A1 | 8/2007 | Robinson et al. | |
| 2007/0252678 A1 | 11/2007 | Garcia Alonso et al. | |
| 2008/0040210 A1 | 2/2008 | Hedley | |
| 2008/0077417 A1 | 3/2008 | Lazzarino et al. | |
| 2008/0248819 A1 | 10/2008 | Smith et al. | |
| 2008/0270226 A1 | 10/2008 | Archibald | |
| 2009/0089156 A1 | 4/2009 | Robinson et al. | |
| 2009/0146845 A1 | 6/2009 | Hedley | |
| 2009/0292596 A1* | 11/2009 | Robinson et al. | 705/13 |

FOREIGN PATENT DOCUMENTS

| | | |
|---|---|---|
| JP | 2004213569 A A | 7/2004 |
| JP | 2004227259 A | 8/2004 |

OTHER PUBLICATIONS

U.S. Appl. No. 11/516,380, Robinson et al.
U.S. Appl. No. 11/516,376, Robinson.
"Overview of Meeting Proceedings", 2004 IBTTA Technology Committee, Spring Technology Workshop, Miami, Florida, USA, (4 pages).
Dick Schnacke, "The 5.9 GHZ DSRC Prototype Development Program", IBTTA Technology Workshop, Madrid, Spain, Nov. 14, 2004, (37 pages).
U.S. Appl. No. 11/651,414, Robinson et al.
U.S. Appl. No. 11/580,527, Robinson.
U.S. Appl. No. 11/810,751, Robinson et al.
U.S. Appl. No. 11/640,550, Robinson et al.
U.S. Appl. No. 11/803,933, Robinson et al.
U.S. Appl. No. 11/810,752, Robinson et al.
Young, Lee W. International Search Report for PCT/US 08/10258 as mailed Nov. 10, 2008 (3 pages).
U.S. Appl. No. 12/268,680, Balachandran et al.
Copenheaver, Blaine R., "International Search Report" for PCT/US2009/060352 as mailed Dec. 10, 2009, (4 pages).
Fernandez, Paneda, J., "Supplementary European Search Report", Nov. 5, 2009, (4 pages).
U.S. Appl. No. 12/437,621, Robinson et al.
U.S. Appl. No. 12/433,954, Robinson et al.
U.S. Appl. No. 12/433,479, Robinson et al.
U.S. Appl. No. 12/437,782, Robinson et al.
U.S. Appl. No. 11/985,985, Robinson et al.
U.S. Appl. No. 11/903,687, Robinson et al.
Astarita, Vittorio et al., "The use of Mobile Phones in Traffic Management and Contol", 2001 IEEE Intelligent Transportation Systems Conference Proceedings, Oakland, CA, Aug. 25-29, 2001, pp. 10-15.
"Toll Ring System; Oslo, Norway", www.eltis.org/studies/leda17.htm; retrieved Dec. 27, 2002 using archive.org., 4 pages.

* cited by examiner

TRANSFERRING TOLL DATA FROM A THIRD PARTY OPERATED TRANSPORT TO A USER ACCOUNT

CROSS REFERENCE TO RELATED APPLICATIONS

The present patent application is related to commonly assigned U.S. patent application Ser. No. 11/640,550 entitled PAYING TOLLS UTILIZING A FINANCIAL SERVICE PROVIDER AND PAYING A SUBSCRIPTION OR LICENSE FEE, filed on even date herewith, the entire contents of which are incorporated by reference herein.

BACKGROUND OF THE INVENTION

The present invention is generally related to toll billing and, more specifically to a transferring toll data from a third party operated transport to a user account.

A toll road, tollway, turnpike, pike or tollpike is a road on which a toll authority collects a fee for use. Similarly there are toll bridges and toll tunnels. Non-toll roads are financed using other sources of revenue, most typically gasoline tax or general tax funds. Tolls have been placed on roads at various times in history, often to generate funds for repayment of toll revenue bonds used to finance constructions and/or operation.

Two variations of toll roads exist: barrier (mainline) toll plazas and entry/exit tolls. On a mainline toll system, all vehicles stop at various locations on the highway to pay a toll. While this may save money from the lack of need to construct tolls at every exit, it can cause traffic congestion, and drivers can evade tolls by going around them (as the exits do not have them). With entry/exit tolls, vehicles collect a ticket when entering the highway, which displays the fares it will pay when it exits, increasing in cost for distance traveled. Upon exit, the driver will pay the amount listed for the given exit. Should the ticket indicate a traveling violation or be lost, the driver would typically pay the maximum amount possible for travel on that highway.

The term turnpike refers to the pike or long stick that was held across the road, and only raised or turned aside when the traveler paid the toll. Travelers have disliked toll roads not only for the cost of the toll, but also for the delays at tollbooths.

An adaptation of military "identification friend or foe" or RFID technology, called electronic toll collection, is lessening the delay incurred in toll collection. The electronic system determines whether a passing car is enrolled in the program, alerts enforcers if it is not. The accounts of registered cars are debited automatically without stopping or even opening a window. Other systems are based on GPRS/GSM and GPS technology. One of the advantages of GPS-based systems is their ability to adapt easily and quickly to changes in charge parameters (road classes, vehicle types, emission levels, times slots etc). Another advantage is the systems' ability to support other value-added services on the same technology platform. These services might include fleet and vehicle engine management systems, emergency response services, pay-as-you-drive insurance services and navigation capabilities.

The first major deployment of an RFID electronic toll collection system was on the Dallas North Tollway in 1989. The RFID technology used on the Dallas North Tollway was originally developed at Sandia Labs for use in tagging and tracking livestock.

Highway 407 in the province of Ontario, Canada has no tollbooths and instead, the rear license plates of all vehicles are photographed when they enter and exit the highway. A bill is mailed monthly for usage of the 407. Lower charges are levied on frequent 407 users who carry electronic transponders in their vehicles. The approach has not been without controversy: In 2002 the 407 ETR settled a class action with a refund to users.

Some systems use a small radio transponder mounted in or on a customer's vehicle to deduct toll fares from a pre-paid account as the vehicle passes through the toll barrier. This reduces manpower at tollbooths and increases traffic flow and fuel efficiency by reducing the need for complete stops to pay tolls at these locations.

By designing a tollgate specifically for electronic collection, it is possible to carry out open-road tolling, where the customer does not need to slow at all when passing through the tollgate. The state of Texas is testing a system on a stretch of Texas 121 that has no tollbooths. Drivers without a TollTag have their license plate photographed automatically and the registered owner will receive a monthly bill, at a higher rate than those vehicles with TollTags.

Electronic toll collection (ETC) systems also have drawbacks. A computer glitch can result in delays several miles long. Some state turnpike commissions have found that such a system would be ineffective because most of the people who use the turnpike are not commuters, are from states that have no ETS on turnpikes, or are from states that don't have a turnpike at all. The toll plazas of some turnpikes are antiquated because they were originally built for traffic that stops to pay the toll or get a ticket.

Currently meeting car rental agency and car rental customer needs with respect to toll billing presents difficulties. Currently car rental customers are unable to use the fast toll lanes. The only alternative available to car renters was to line up at tollbooths and wait to pay tolls. Some car renters find themselves under significant time pressure and run the booths, causing problems and expense for toll authorities and car rental agencies. As electronic toll collection technology has improved, toll authorities have begun to hold rental agencies accountable for toll violations.

Therefore, what is needed is management of toll billing. More specifically, what is needed is an automated management system that manages toll billing for the car rental agencies and allows car renters to utilize the fast lane.

SUMMARY OF THE INVENTION

Toll Account Assignment (TAA)

Toll account assignment is a service that allows car renters to use their existing Toll account while driving the rental car on the toll roads.

Rental Car Agency (RCA)

Rental car agencies are commercial entities that rent cars to customers for a fee.

Toll Authority (TA)

Toll authorities are government, quasi-government or private entities that are legally authorized to collect tolls. These entities are required by law to use the collected tolls to build and maintain the roads for which the tolls are collected.

Opt-In

The Opt-In process facilitates the car renter's agreement to use their existing toll account while driving the rental car on the toll roads. This document also refers to an Opt-In as a Toll Account Assignment request.

Opt-Out

An Opt-Out occurs when the car renter chooses to rent a vehicle with out the toll account assignment service.

License Plate Recognition (LPR)

License plate recognition is an image processing technology used to identify vehicles by their license plates. This system uses a camera and infrared illumination to capture the vehicles license plate image. With the help of image processing software, license plate number information is extracted from the image to a text string. The string is then sent to the present invention from the toll authority.

Toll Violation

If the rental customer chooses to opt-in for the Toll Account Assignment then there will be no toll violations to consider because all tolls accrued will be billed directly to their existing toll account. However, if customer decides not to use the Toll Account Assignment, and the rental agency has the Pass service, then that customer would then be placed into an Imposed Opt-In and the fees associated with this violation will be placed onto the customers' bill.

Rental Agreement Number (RAN)

When a person rents a car, they sign a rental agreement with the rental car agency. A rental agreement number uniquely identifies each rental agreement. The rental agreement number is an ideal reference to attach a car renter with the toll account assignment Service. The rental agreement number is a reference number used between rental car agency and the present invention for Opt-In transactions. Rental car agency should always send the rental agreement number to the present invention for any toll account assignment Opt-Ins.

Toll Account Assignment System Overview

In the toll account assignment system, the rental license plate number, Optical Character Recognition (OCR), Radio Frequency Identification (RFID), and Onboard Unit (OBU) are used as common references between the rental car agency, toll authority, and the present invention systems. This section explains how the rental license plate number, OCR, RFID, and OBU are used to integrate all three systems.

When the car renter chooses to Opt-In into toll account assignment, the rental car agency sends the Opt-In details to the toll authority via the present invention system. The present invention functions as a clearinghouse to communicate appropriate information to the toll authorities. When a rental vehicle crosses a tollgate, the toll authority system captures the vehicle using an optical character recognition OCR reader in the toll plaza. If the license plate number, transponder, RFID, or OBU are part of the present invention Opt-In database, the toll authority saves the toll usage information for the Opt-In period and updates the present invention.

Because the present invention offers the toll account assignment service, using the OCR, RFID, or OBU to capture the rental vehicle information will confirm that this is vehicle is a toll account assignment subscriber and then charge the drivers existing toll account for the tolls used.

Rental car agency sends toll account assignment Opt-In request to the present invention. Car renter rents vehicle and chooses to Opt-in to the toll account assignment service. Rental car agency notifies the present invention to verify that customer has an existing toll authority account and that this customer has chosen the toll account assignment service.

The present invention updates toll account assignment request (Opt-In) to the toll authority. The present invention notifies the toll authority of the Opt-In service request with vehicle information, start date, expected end date and any other required information, receives toll usage from the toll authority for the Opt-In.

When the car renter returns the vehicle to the rental car agency, the rental car agency notifies the present invention with the end transaction. At the conclusion of the rental period the present invention will then pass the end date to the toll authority to inform that the account for the rental car should be closed and the customers, toll authority should now recognize their personal vehicle for future transactions.

Toll Account Assignment Features

Rental Car Agency National Support

The present invention maintains a database of the rental car agency's national fleet. Whenever the present invention enters a new toll market, the rental car agency has immediate toll account assignment access to offer car renters.

Toll Account Assignment Benefits

The toll account assignment has many benefits extending to the toll authority, rental car agency, car renter, local drivers and other interested parties. Some of the most important benefits of toll account assignment include:

Eliminates car renter toll violations for rental car agencies that offer the toll account assignment service;

Eliminates toll violation collection efforts by rental car agencies that offer the toll account assignment service;

Generates substantial new revenues for rental car agencies and eliminates operational expenses typically spent on tracking down violators; and Improves car renter travel experience within toll systems.

Rental Agency Setup

Each rental car agency will have an account containing information about their rental vehicles among other information. This information is important due to the movement of rental vehicles between geographical locations, the present invention needs the complete rental agency fleet registered to provide consistent service. If rental car agency signs up for toll account assignment then by default all the rental vehicles will be enrolled. When the present invention moves to a new market, the rental car agency can offer car renters toll account assignment for that location without any significant change.

The rental vehicle information is synchronized between the toll account assignment system and rental car agency application periodically. This might be updated nightly using the web service interface or FTP service. Whenever vehicles are added or removed from the fleet, information is sent from rental car agency to the present invention system. This is called vehicle status update and is initiated by rental car agency. Information exchanged between rental car agency and toll account assignment application is completed using XML file transfer (FTP is another option for file transfer).

Opt-In Transactions

If the car renter is interested in using the toll account assignment service, the customer has to sign an agreement stating that they are responsible for using their existing toll account to pay the Toll fees for their rental period. This allows the renter to use high-speed toll lanes during the rental period. The renter does not need to stop or pay any toll fees at the tollgate. Opt-In transactions are the transactions that are made by the car renter with toll account assignment service.

Begin Opt-In

When the rental car agency rents the vehicle to the car renter, the rental car agency will offer the toll account assignment Opt-In service to the customer so the customer can use the toll roads for the given period in the rental agreement number. Rental car agency notifies the present invention to begin the transaction for the rental period using web service request or other communication protocols.

The following documents the rental car agency setup to use the toll account assignment service provided by the present invention.

The rental car agency begins rental process. The rental car agency asks rental customer if they have an existing toll authority account. The rental customer informs rental car agency that they do not have existing toll authority account.

The rental car agency sends rental customer details to the present invention to set up rental customer for Pass service. The toll authority verifies that the customer does not have an existing/valid account.

The present invention receives this notice from toll authority. The present invention must deny toll account assignment service because the rental customer does not have an existing/valid account with toll authority. The rental car agency receives this info from the present invention at which rental car agency offers Pass service to rental customer. The rental car agency sends rental customers Pass Opt-In details to the present invention. The present invention follows normal Pass process. The toll authority verifies that rental customer does have an existing/valid toll authority account and sends that info to the present invention. The present invention receives this confirmation of existing/valid account from toll authority. At this point the present invention creates a confirmation message and sends to rental car agency. The rental car agency sets up rental customer for toll account assignment Opt-In service. The rental car agency sends rental agreement number, start and end time, toll authority account info, rental vehicle info to the present invention. The present invention receives this info from rental car agency and transfer toll account assignment Opt-In details to toll authority. The toll authority receives the toll account assignment Opt-In details from the present invention.

The following elaborates on how rental car agency, the present invention, and toll authority interact to ensure proper toll account assignment Opt-In set up occurs.

The rental car agency begins toll account assignment setup. The rental car agency asks rental customer if they have an existing/valid toll authority account. Rental customer says that they do not have an existing/valid toll authority account. At this point rental car agency offers Pass service and transfer Pass details to the present invention. The present invention then follows Pass process.

The rental car agency begins toll account assignment setup. The rental car agency asks rental customer if they have an existing/valid toll authority account. Rental customer says yes they do have an existing/valid toll authority account. At this point rental car agency sends rental customer personal info to the present invention. The required info that the present invention will need is, but is not limited to, rental customers' personal vehicle info, i.e. rental customers' license plate number, last name, billing address, drivers license number, and transfers that info to the present invention. The present invention takes this info and verifies that this rental customer does have a toll authority account that is existing/valid. The toll authority confirms that this rental customer's toll authority account is not valid. The toll authority sends that info back to the present invention. The present invention then sends deny of toll account assignment service because the account does not exist back to rental car agency. The rental car agency then offers Pass service to rental customer. The rental car agency then send Pass service required details back to the present invention. The present invention then follows Pass service process.

The rental car agency begins toll account assignment setup. The rental car agency asks rental customer if they have an existing/valid toll authority account. Rental customer says yes they do have an existing/valid toll authority account. At this point rental car agency sends rental customer personal info to the present invention. The required info that the present invention will need is, but is not limited to, rental customers' personal vehicle info, i.e. rental customers' license plate number, last name, billing address, drivers license number, and transfers that info to the present invention. The present invention takes this info and verifies that this rental customer does have a toll authority account that is existing/valid. The toll authority confirms that this rental customer's toll authority account does exist and is valid. The toll authority sends that info back to the present invention. The present invention then sends confirmation message back to rental car agency. The rental car agency then creates a toll account assignment Opt-In account. The rental car agency sends rental agreement number, start and end time, confirmation number, and renal vehicle info to the present invention. The present invention then transfers this info for toll account assignment Opt-In details to toll authority. The toll authority receives toll account assignment Opt-In details.

The present invention system assigns toll account assignment Opt-In transaction number for further reference. If the customer wants to cancel the toll account assignment Opt-In request, rental car agency can use toll account assignment Opt-In transaction number to cancel the service.

Billing

The following actions are taken by rental car agency and the present invention, to ensure proper billing procedures. The rental car agency begins invoice process for closed Opt-In's. The rental car agency sends closed Opt-In information to the present invention. The present invention then applies service charge to reflect the duration of the toll account assignment Opt-In account and an End Invoice is sent.

The following is the rental car agency and the present invention billing process. An invoice is produced to list all the Closed Opt-In's that have not been invoiced. The present invention is to provide the duration of the rental so appropriate fees can be allocated. The present invention receives the closed Opt-In duration information and applies appropriate charges and end invoice. The actions taken by the present invention to ensure proper billing procedures take place for Open Opt-In tickets over certain duration of time. The present invention begins invoice process for open Opt-In's that have been open for certain duration of time. The present invention lists all open toll account assignment Opt-In's that have not been invoiced. The present invention applies toll account assignment service charges to open Opt-In's and End Invoice is sent.

The following is the present invention billing process take place for Open Opt-In tickets over a certain duration of time. The present invention invoices are produced for all Open Opt-Ins that have not been invoiced. The present invention applies appropriate toll account assignment service charges to Open Opt-ins and end invoice.

Vehicle Information Table

The following are the vehicle properties that are used for the toll account assignment registration:

Drivers License Number;
License Plate Number;
License Type;
Vehicle Identification Number;
Make;
Model;
Year;
State/Province of Registration; and
Vehicle Class.

Opt-In Request Message

The following information is expected to be sent from the rental car agency to the present invention for Opt-In service using web service request, when the rented vehicle leaves the parking location or when a vehicle is rented from the rental car agency facility. Multiple Opt-In requests can be grouped into one single request for processing to the present invention. Header information will help to group multiple Opt-In.

Opt-In Details
Request Mode
Unique ID provided by the present invention to the rental agency for rental agency identification
   Allowed Values {"B", "E"}
   B→Begin Opt-In
   E→End Opt-In, will trigger billing
   R→Vehicle Renewal
   C→Cancel Opt-In
   Rental Agency Opt-In ID
   Batch Id/transaction id generated by the rental car agency for tracking purpose:
   Rental Agreement Number;
   Service Start Date;
   Service End Date; this value will be over written if the renter returns earlier than the original end date or if the renter renews his/her rental period. If the Opt-In request is open and the system date is greater than one day of original end date, i.e., if there is no end transaction and the Opt-In expired, the present invention will close the pending transaction.
   If the request mode is "R", Service End Date will have new end date which should be greater than the original service end date;
   License Number of toll authority account;
   License Plate Number of the rental customers' personal vehicle that the toll authority account is registered to;
   License Number;
   Vehicle State;
   Rental Vehicle ID;
   Rental Location;
   Renewal date, if the request mode is "R", renewal date should be sent to the present invention;
   Cancel date; if the request mode is "C", cancel date should be sent to the present invention; and
   Return date.

In one embodiment of the present invention, a method for transferring toll data from a third party operated transport to a user account comprises, performing a verification of the user account, receiving a service request to transfer tolls incurred by the third party operated transport, receiving toll data, and sending information related to the user account if the toll data and the service request match. The method of claim may also comprise charging the user account for the tolls incurred by the third party operated transport, wherein the service request comprises, rental information related to the third party transport, and an identifier of the user account, and wherein the service request includes at least one of, a rental agreement number for the third party transport, a toll fee device identifier, a start date of the service, a start time of the service, an end date of the service, and an end time of the service. The method identifier of the user account may include at least one of, a user's name, the user's account number, the user's transponder, the user's address, the user's driver license number, the user's driver license state, the user's credit card number, the user's debit card number, the user's electronic account number, the user's insurance information, the user's email address, and the user's phone number. The rental information related to the third party transport may include at least one of, an owner of the transport, a user of the transport, a license plate number of the transport, a vehicle identification number of the transport, a type of the transport, a color of the transport, a year of manufacture of the transport, and a condition of the transport, wherein the rental information related to the third party transport is related to at least one of, a service period and a rental period. The service period may be at least one of, seconds, minutes, hours, days, months, and years. The rental period may be at least one of, a duration based transport rental service, a pre-authorized transport rental service, a pre-authorized, duration based transport rental service, an unlimited transport rental service, and a location based transport rental service. The performing of the verification of the user account, and the receiving of the service request to transfer tolls incurred by the third party operated transport may occur in at least one of, parallel, serially, and in any order. The user account may be related to a toll authority. The toll data may comprise at least one of, a toll amount incurred by the transport, a time the toll amount was incurred, a toll location, a toll date, a direction of travel by the transport, a location of the transport, information related to transport, information related to a license plate of the transport, a location of toll facility, and a location of toll lane.

In another embodiment of the present invention, a computer readable medium comprises instructions for, receiving a service request by a toll rental entity, wherein the service request comprises: information related to a user account, and a rental agreement for a transport, performing a verification of the user account, if the user account is verified, sending the service request to a toll authority, charging the user account for the tolls incurred by the third party operated transport if the toll data and the service request match. The computer readable medium may also comprise instructions for receiving a fee at the toll rental entity from a third party entity for performing the verification and for sending the service request, performing the verification before the rental agreement is complete and performing the verification after the rental agreement is complete.

In a further embodiment of the present invention, a system for verifying a user account in order to transfer toll data from a third party operated transport to a user account, comprises, a third party entity, a toll authority, and a toll rental entity communicably coupled to the third party entity and to the toll authority, wherein the toll rental entity, receives user account information from the third party entity, validates the user account information, determines if the toll authority sends user account information, if the toll authority sends the user account information, verifies the user account information, and if the user account information is verified, determines if the verification occurred prior to a rental of the third party operated transport. Wherein the toll rental entity may send a verification response to the third party entity if the verification occurred prior to the rental of the third party operated transport, the toll rental entity verifies the user account information remotely if the toll authority does not send the user account information and the toll rental entity notifies the third party entity that the user account information is not verified if the user account information is not verified. Wherein the toll rental entity may store the user account information if the verification occurred after the rental of the third party operated transport, the toll rental entity may send the stored user account information to the toll authority for billing purposes, the toll authority may send account information for all its user's, including the user and the third party entity may send the account information for the user.

In yet a further embodiment, a module comprises, at least one processor and storage associated with the at least one processor, wherein the at least one processor executes instructions to, receive user account information, verify the user account information, determine if the verifying occurred prior to a rental of a third party operated transport, and send a verification response if the verification occurred prior to the rental of the third party operated transport. In this embodiment, when the customer opts-in for the tollport service, the TRE captures the customer information such as toll account ID, toll account electronic card, driver's license number, customer last name, first name zip code, phone number, etc. to validate customer user account. User account verification can be acquired either electronically or manually using wired or wireless communication. Validations can be either pre rental or post rental time. If the validation fails, TRE or TPE charges customer by the existing payment methods or allows the customer to choose alternate TRE products such as, for example, a PASS24 pre-rental. If the account verification fails after post rental validation, the customer will be charged though his/her credit card. The Toll Authority (TA) then receives toll information or toll usage from the toll plaza or toll facility. The TA checks if the vehicle matches the TRE vehicle database. If the vehicle matches the TRE fleet for the tollport service then the TA will check for if the TRE sends user account information for the toll usage based on the user account and then the TA charges the user account. If the TA could not find any user account, the TA sends the transaction details to TRE. TRE then transfers the customer user information to TA. If TRE count does not find the user information locally, the TRE gets the information from the TPE. If the customer did not OPT-IN for the tollport service, either TPE collects payment from the customer for the OPT-OUT transaction, or TPE sends the customer information and TRE collects the service fee from the customer, or TRE sends the customer information to TA and TA collects the fees from the customer.

DETAILED DESCRIPTION OF THE INVENTION

Figure 1:
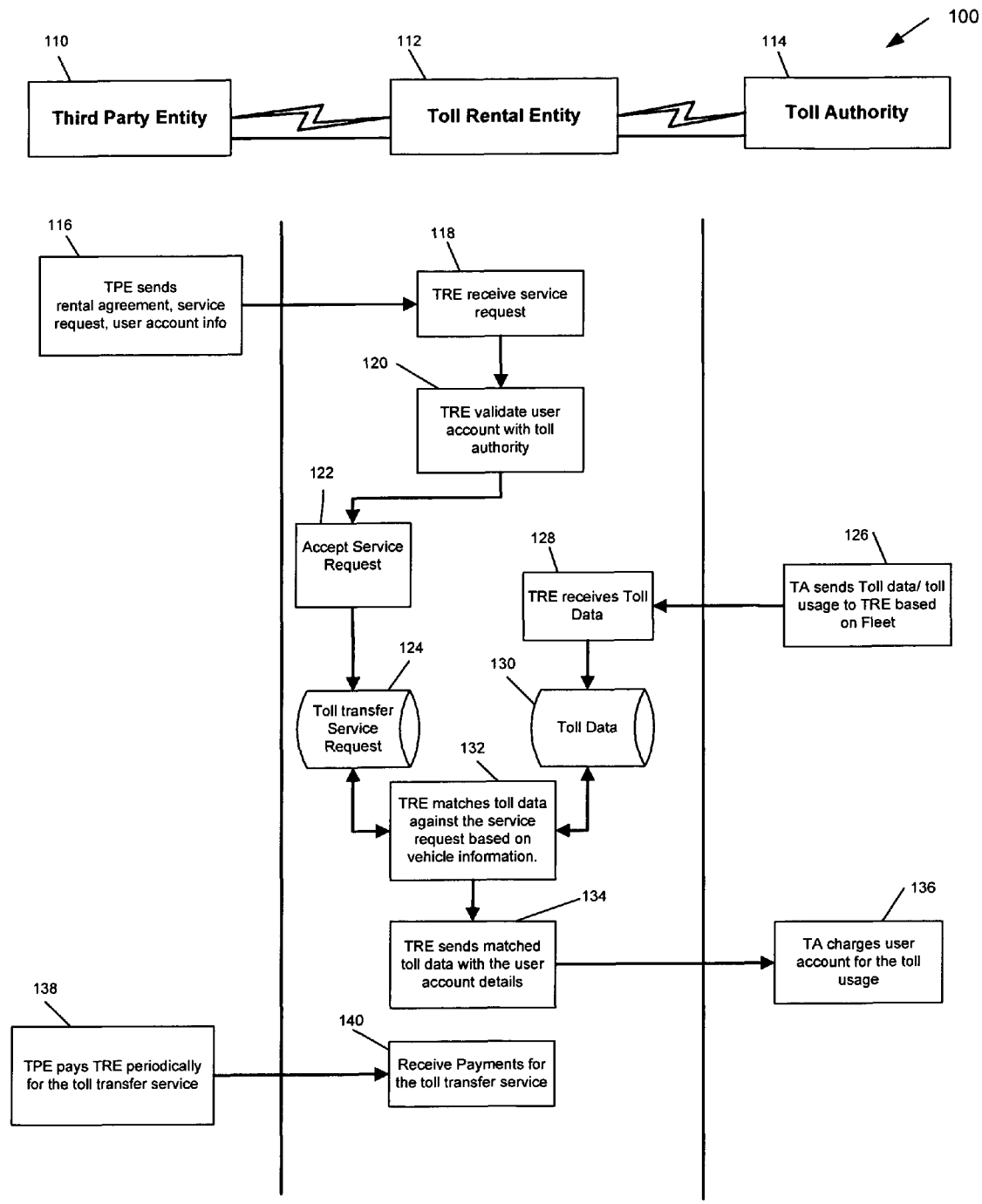
FIG. 1 illustrates a first flow chart of transferring toll data from a third party operated transport to a user account that includes an embodiment of the present invention.

Referring now to FIG. 1, a first method of transferring toll data from a third party operated transport to a user account 100 is depicted. Three entities are in communication a third party entity 110, which can be a car renter, is communicably coupled with a toll rental entity 112, which in this case could be a car rental agency, that is in turn communicably coupled with a toll authority 114. The third party entity sends 116 a rental agreement, service request and user account to the toll rental entity. The third party entity can be a person, but is probably a rental car agency. The toll rental entity can be a rental agency. The toll rental entity receives 118 the service request and validates 120 the user account with the toll authority. After accepting 122 the service request the toll transfer request is stored 124. The toll authority sends 126 the toll data and toll usage to the toll rental entity based on its associated fleet and the toll rental entity stores 130 the sent toll data and toll usage. The toll rental entity matches 132 the stored toll data to the stored service request based on vehicle information. The toll rental entity sends 134 matched toll data with the user account information to the toll authority and the toll authority charges 136 the user account for the toll usage. The transfer of information occurs via at least one of: a wireless protocol, a wired protocol and a combination of the wireless protocol and the wired protocol. The steps in the flow are performed by software, hardware, firmware, and/or the combination of software, hardware, and/or firmware.

Figure 2:
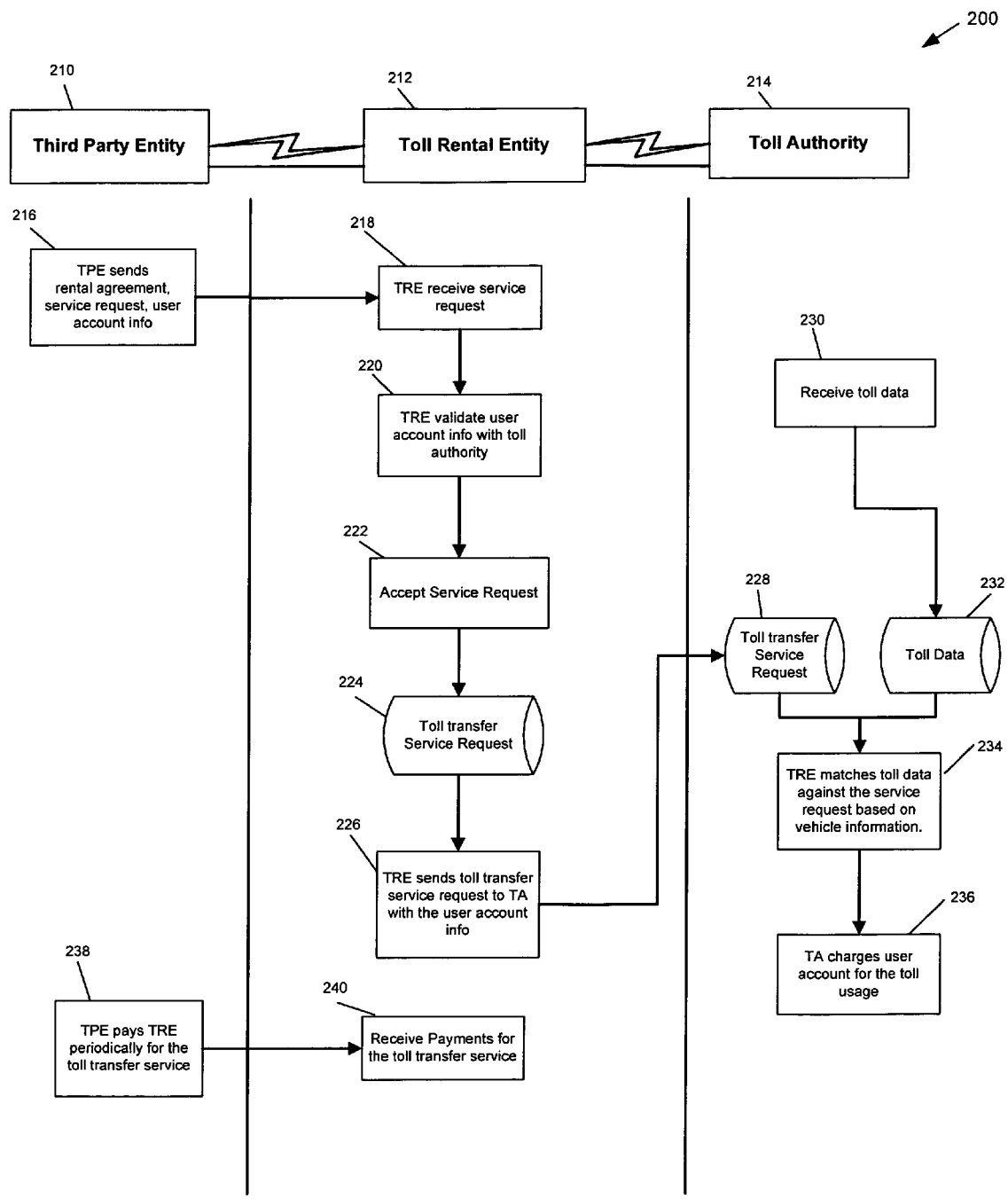
FIG. 2 illustrates a second flow chart of transferring toll data from a third party operated transport to a user account that includes an embodiment of the present invention.

Referring now to FIG. 2, a second flow chart of transferring toll data from a third party operated transport to a user account 200 is depicted. The flow comprises a number of blocks or modules that are software, hardware, or firmware, and/or the combination of software, hardware, and/or firmware. Three entities are in communication a third party entity 210, which can be a car renter, is communicably coupled with a toll rental entity 212, which in this case could be a car rental agency, that is in turn communicably coupled with a toll authority 214. The third party entity can be a person, but is probably a rental car agency. The toll rental entity can be a rental agency. The third party entity sends 216 a rental agreement, a service request and a user account to the toll rental entity that receives 218 the information. The toll rental entity validates 220 the user account with the toll authority. The toll rental entity accepts 222 the request, and stores 224 the toll transfer service request.

The toll rental entity sends 226 the toll transfer service request to the toll authority with the user account information. The toll authority stores 228 the toll transfer service request and the user account information. The toll authority receives 230 toll data and stores 232 the toll data. The toll authority matches 234 the stored service request based on vehicle information to the stored toll data and charges 236 the user account for the toll usage. The third party entity pays 238 the toll rental entity periodically for the toll transfer service and the toll rental entity receives 240 payments for the toll transfer service. These steps are preferably embodied in a computer readable medium or software but may also be embodied in firmware and are utilized via hardware. The transfer of information occurs via at least one of: a wireless protocol, a wired protocol and a combination of the wireless protocol and the wired protocol. The steps in the flow are performed by software, hardware, firmware, and/or the combination of software, hardware, and/or firmware.

Figure 3:
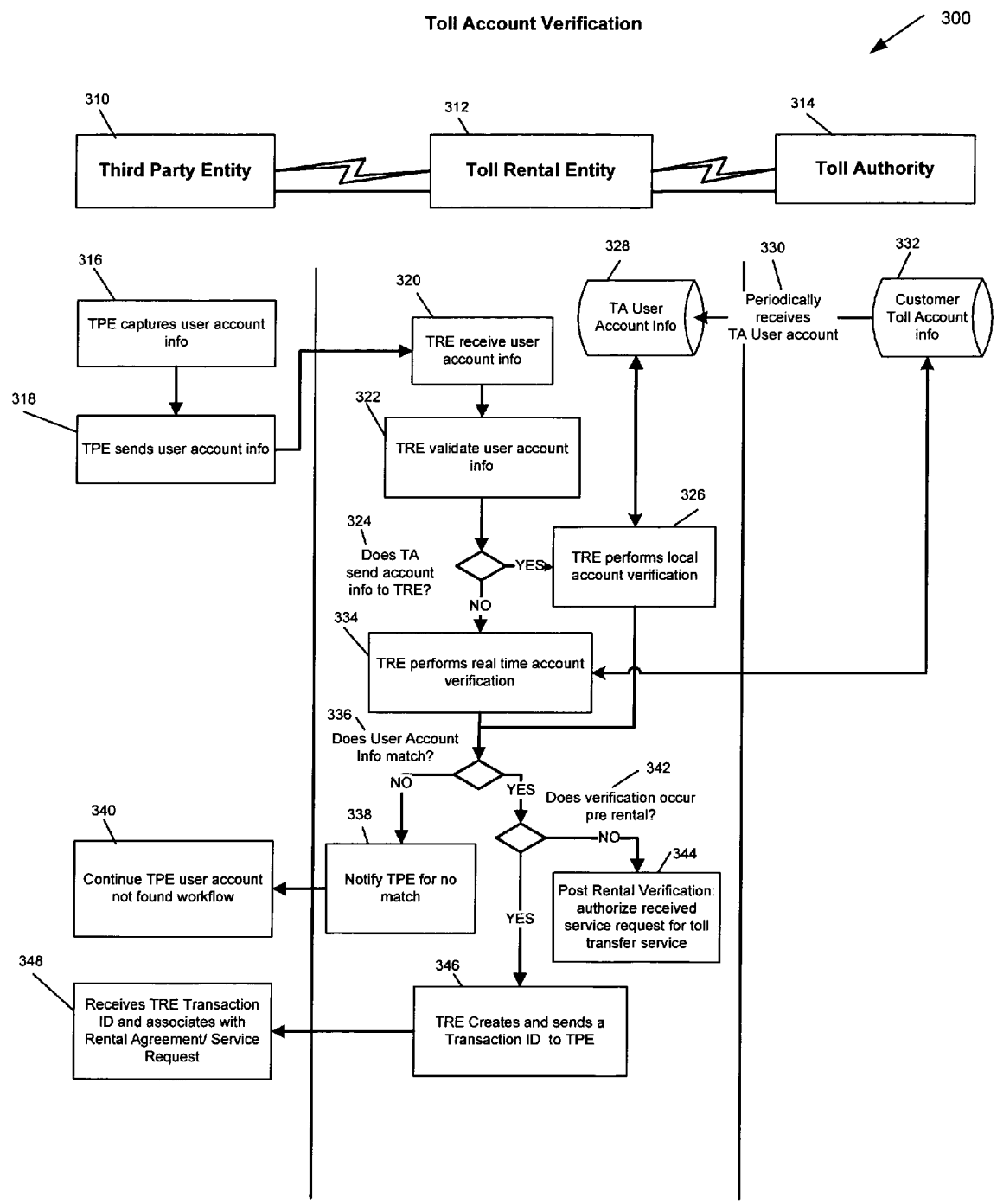
FIG. 3 illustrates a toll account verification that includes an embodiment of the present invention.

Referring now to FIG. 3, a toll account verification 300 that is depicted and comprises a number of blocks or modules that are software, hardware, or firmware, and/or the combination of software, hardware, and/or firmware. The flow comprises a number of blocks or modules that are software, hardware, or firmware, and/or the combination of software, hardware, and/or firmware. Three entities are in communication a third party entity 310, which can be a car renter, is communicably coupled with a toll rental entity 312, which in this case could be a car rental agency, that is in turn communicably coupled with a toll authority 314. The third party entity can be a person, but is probably a rental car agency. The toll rental entity can be a rental agency. The third party entity captures 316 a user account information and sends 318 the user account information to the toll rental entity which receives 320 the user account information. The toll rental entity validates 322 the user account information. The toll authority determines 324 whether to send the account information to the toll rental entity. The toll rental entity locally verifies 326 the user account information and stores 328 the data in the toll authority customer information database.

The toll rental entity periodically receives 330 toll authority customer information from the toll authority. The toll authority stores 332 customer toll account information in a database that may be sent to the toll rental entity. The toll rental entity may verify 334 user account information in real time. A determination 336 is made as to whether the user account information matches. If the information does not match the toll rental entity sends 338 a notification to the third party entity that no match exists and a continuation 340 of the workflow of the third party entity user account not found workflow continues. If the user account information does match a determination 342 is made as to whether the verification has been performed pre-rental. If no pre-rental verification has been performed a post rental verification 344 is performed to authorize the received service request for toll transfer service. If a pre-rental verification has been done the toll rental entity creates 346 and sends a transaction identification to the third party entity. The third party entity receives the transaction identification and associates 348 it with the rental agreement and the service request. These steps are preferably embodied in a computer readable medium or software but may also be embodied in firmware and are utilized via hardware. The transfer of information occurs via at least one of: a wireless protocol, a wired protocol and a combination of the wireless protocol and the wired protocol. The steps performed in this figure are performed by software, hardware, firmware, and/or the combination of software, hardware, and/or firmware.

Figure 4:
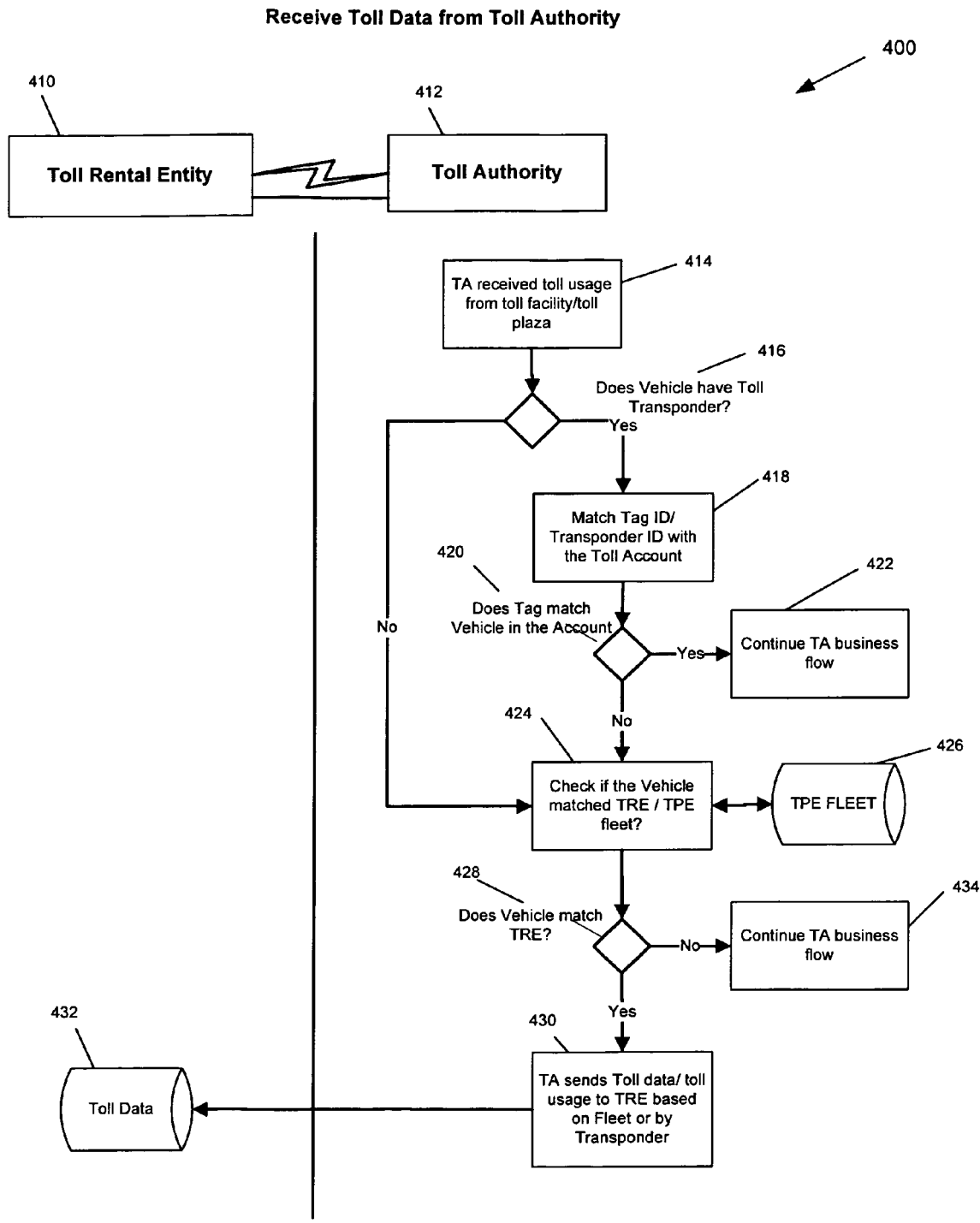
FIG. 4 illustrates a reception of toll data from the toll authority that includes an embodiment of the present invention.

Referring now to FIG. 4, a reception of toll data from the toll authority 400 is depicted and comprises a number of blocks or modules that are software, hardware, or firmware, and/or the combination of software, hardware, and/or firmware. The flow comprises a number of blocks or modules that are software, hardware, or firmware, and/or the combination of software, hardware, and/or firmware. A toll rental entity 410, which in this embodiment is a car rental agency is communicably coupled with a toll authority 412. The toll rental entity may be a rental agency. The toll authority receives 414 toll usage data from a toll facility, toll plaza. A determination 416 is made as to whether the vehicle has a toll responder. If the vehicle is found to have a toll responder the tag identification or transponder identification is matched 418 with a toll account. A determination 420 is made as to whether the tag identification matches the vehicle in the toll account. If the tag matches the vehicle in the account the toll authority business flow is initiated 422. If the tag identification does not match the vehicle in the toll account a check 424 is performed to determine if the vehicle matches a toll rental entity or third party entity fleet. The third party entity fleet it is stored 426 in the third party entity fleet database.

A determination is made whether the vehicle matches 428 the toll rental entity fleet. If the vehicle matches the toll rental entity fleet the toll authority sends 430 the toll data/toll usage to the toll rental entity based on the fleet or transponder, the toll data is stored 432 at the toll rental entity. If the vehicle does not match either the third party entity fleet or the toll rental entity fleet the toll authority initiates 434 its business flow. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 5:
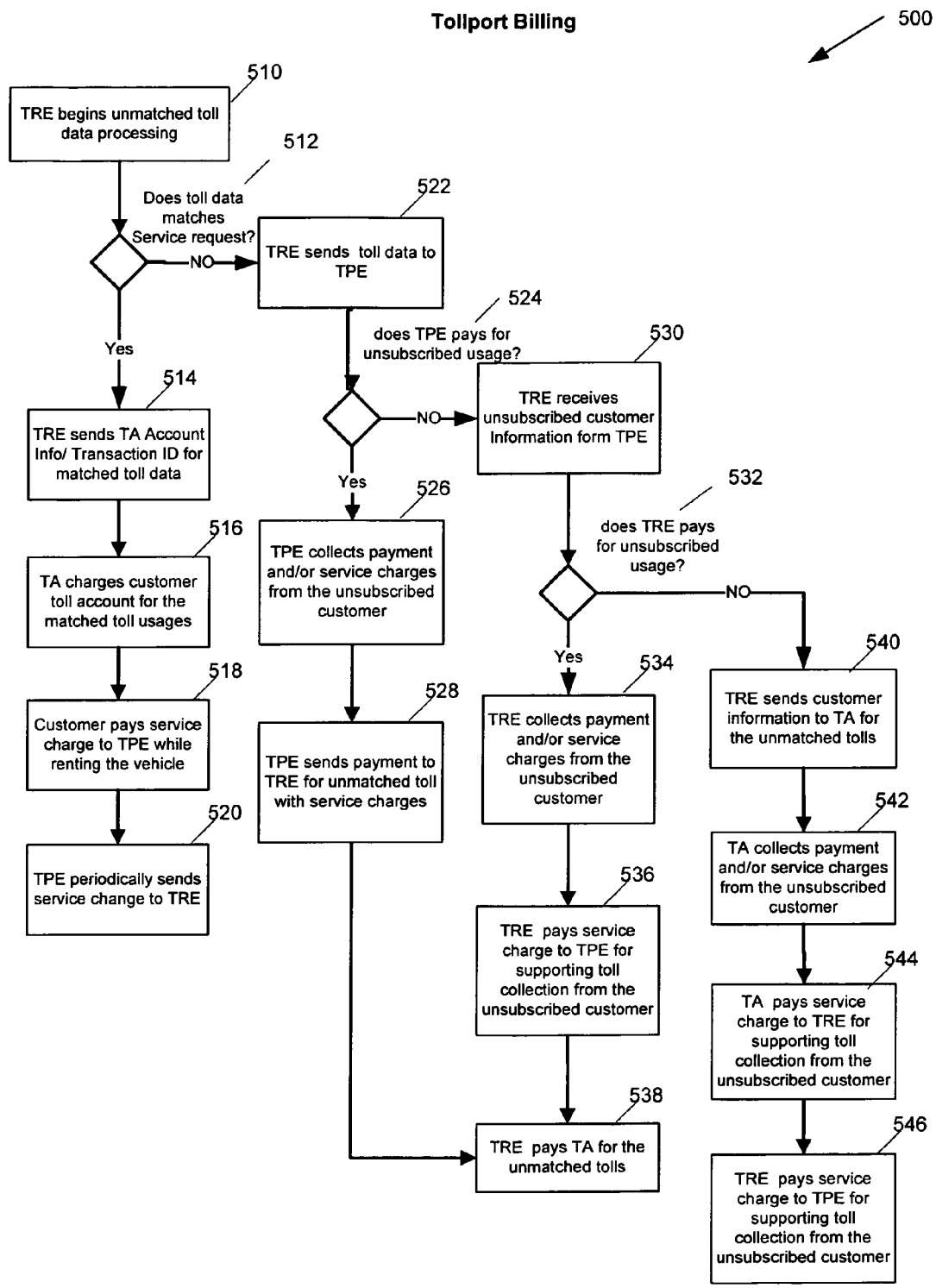
FIG. 5 illustrates a toll account billing that includes an embodiment of the present invention.

Referring now to FIG. 5, a toll account billing 500 is depicted. The toll rental entity initiates unmatched toll data processing 510. A determination 512 is made as to whether the toll data matches the service request. If a toll match has been found the toll rental entity sends 514 the toll authority user account information and a transaction identification for the matched toll data. The toll authority bills 516 the customer toll account for the matched toll usages. The customer pays 518 a service charge to the third party entity while renting the vehicle, and the third party entity periodically sends 520 a service change to the toll rental entity. If no toll match is found the toll rental entity sends 522 toll data to the third party entity. A determination 524 is made as to whether the rental car agency pays for unsubscribed usage. If the car rental entity does pay for unsubscribed usage the third party entity collects 526 payment and any service charges from the unsubscribed customer. The third party entity sends 528 payment to the toll rental entity for unmatched tolls with service charges.

If the rental car agency does not pay for unsubscribed usage the toll rental entity receives 530 unsubscribed customer information from the third party entity. A determination 532 is made as to whether the toll rental entity pays for the unsubscribed usage. If the toll rental entity does pay for unsubscribed usage the toll rental entity collects 534 payment and any service charges from the unsubscribed customer. The toll rental entity pays 536 the service charge to the third party entity for supporting toll collection from the unsubscribed customer and the toll rental entity pays 538 the toll authority for the unmatched tolls. If the toll rental entity does not pay for unsubscribed usage the toll rental entity sends 540 customer information to the toll authority for unmatched tolls. The toll authority collects 542 payment and any service charges for the unsubscribed customer. The toll authority pays 544 a service charge to the toll rental entity for supporting toll collection from the unsubscribed customer and the toll rental entity pays 546 a service charge to the third party entity for supporting toll collection from the unsubscribed customer. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 6:
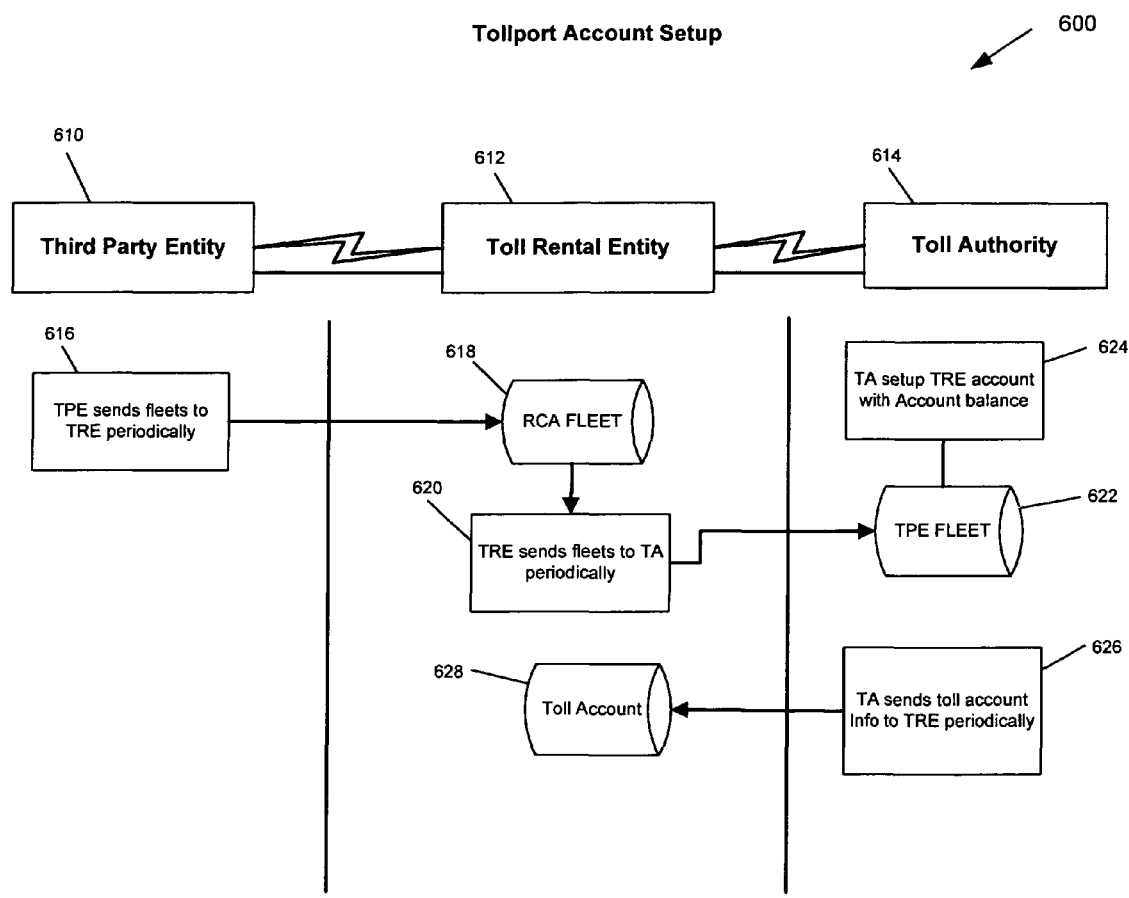
FIG. 6 illustrates a toll account setup that includes an embodiment of the present invention.

Referring now to FIG. 6, a toll account setup 600 is depicted. Three entities are in communication a third party entity 610, which can be a car renter, is communicably coupled with a toll rental entity 612, which in this case could be a car rental agency, that is in turn communicably coupled with a toll authority 614. The third party entity is a rental car agency and or a customer. The most likely third party entity is a rental agency. The toll rental entity may be a car rental agency. The third party entity periodically sends 616 fleet information to the toll rental entity. The toll rental entity stores 618 the rental car agency fleet data. The toll rental entity periodically sends 620 the fleet data to the toll authority where it is stored 622. The toll authority sets up 624 the third party entity with an account balance. The toll authority periodically sends 626 toll account information to the toll rental entity. The toll rental entity stores 628 the received toll account information. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 7:
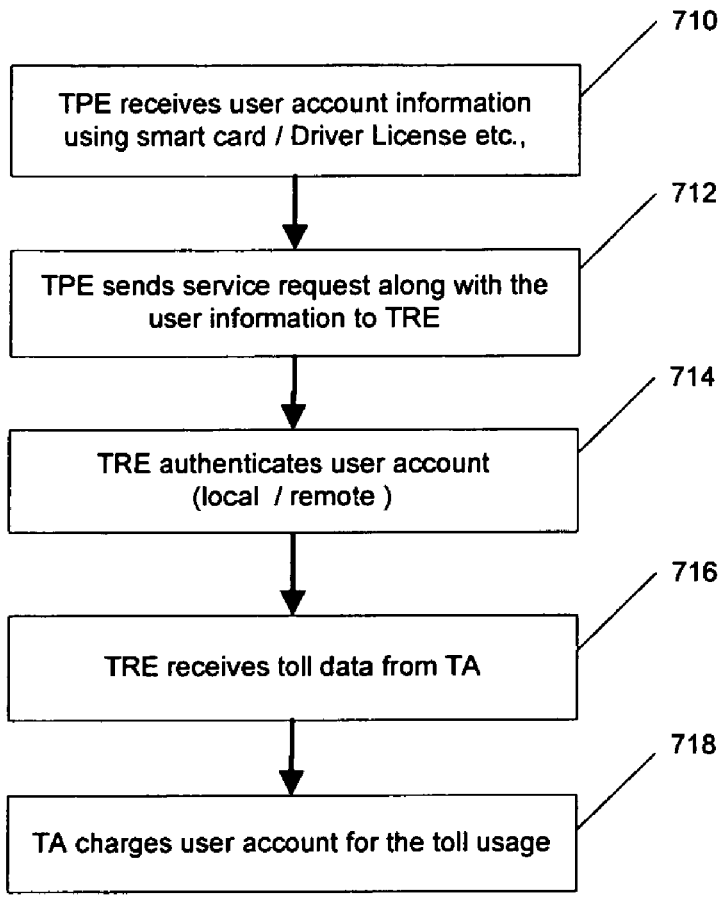
FIG. 7 illustrates a first model flowchart that includes an embodiment of the present invention.

Referring now to FIG. 7, a first model flowchart 700 is depicted. The third party entity receives 710 user account information, which may come from a smart card or a drivers license. The third party entity sends 712 the service request with the user information to the toll rental entity. The toll rental entity authenticates 714 the user account either locally or remotely. The toll rental entity receives 716 toll data from the toll authority and the toll authority charges 718 the user account for the toll usage. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 8:
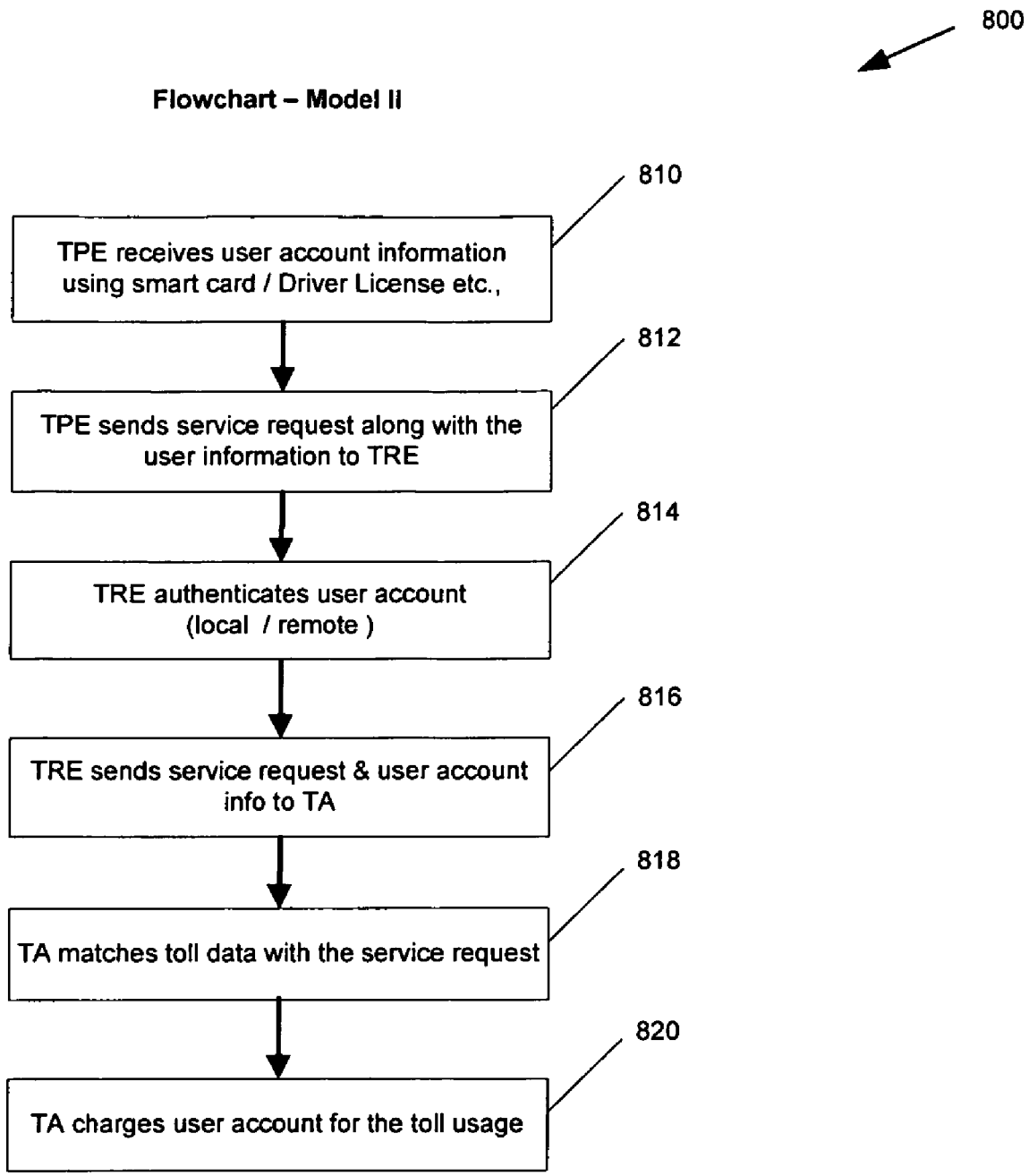
FIG. 8 illustrates a second model flowchart that includes an embodiment of the present invention.

Referring now to FIG. 8, a second model flowchart 800 is depicted. The third party entity receives 810 user account information, which may come from a smart card or a drivers license. The third party entity sends 812 the service request with the user information to the toll rental entity. The toll rental entity authenticates 814 the user account either locally or remotely. The toll rental entity sends 816 the service request and user account information to the toll authority. The toll authority matches 818 the toll data with the service request. The toll authority charges 820 the user account for the toll usage. These steps are preferably embodied in a computer readable medium or software but may also be embodied in firmware and are utilized via hardware. The transfer of information occurs via at least one of a wireless protocol, a wired protocol and the combination of the wireless protocol and the wired protocol.

Figure 9:
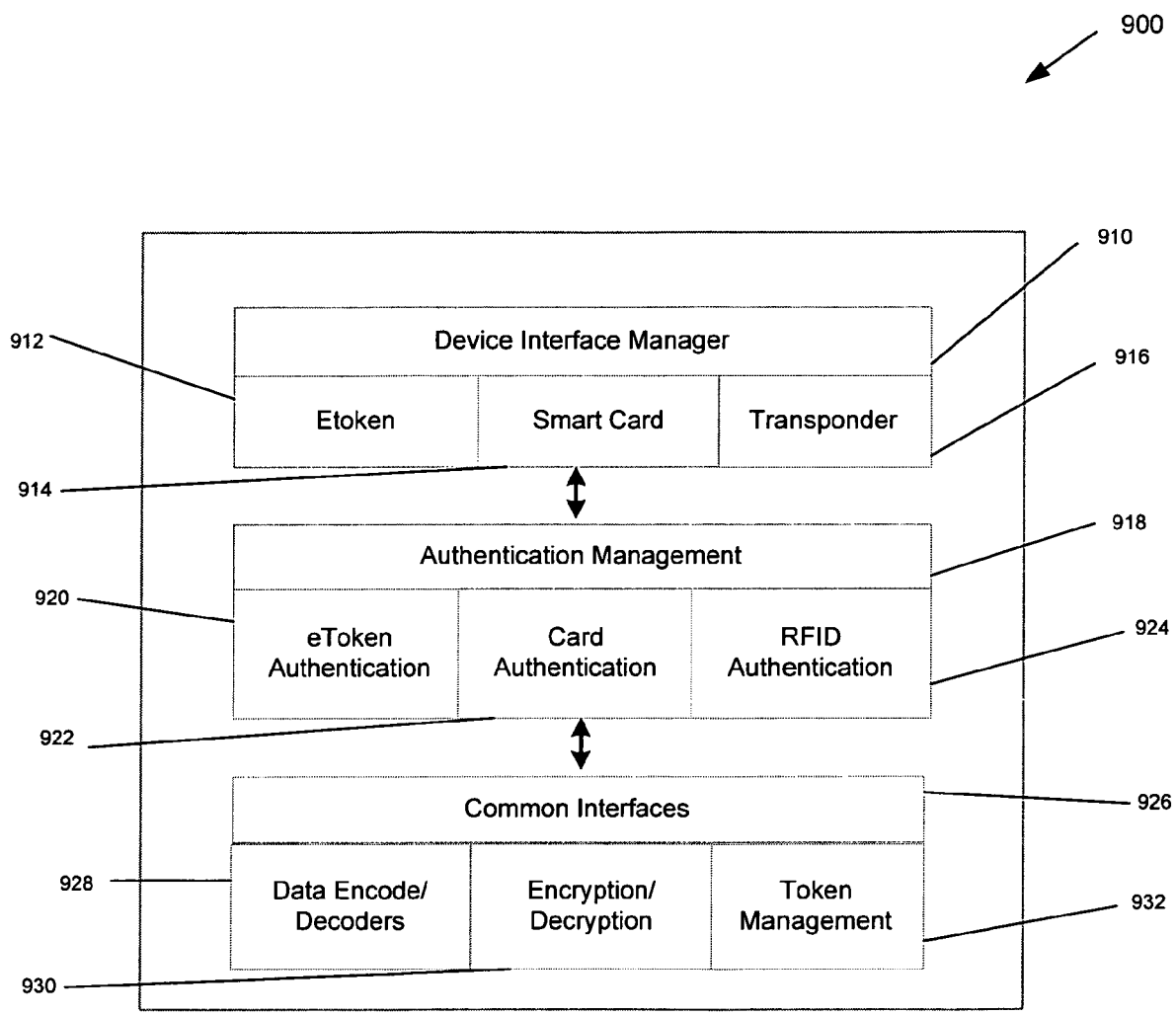
FIG. 9 illustrates a first toll account system of transferring toll data from a third party operated transport to a user account in accordance with an embodiment of the present invention.

Referring now to FIG. 9, a first toll account system of transferring toll data from a third party operated transport to a user account 900 is depicted. A device interface manager 910 can be comprised of an e-token 912, a smartcard 914 or a transponder 916. The device interface manager is communicably coupled with an authentication manager 918, which may be comprised of an e-token authentication 920, a card authentication 922 or an RFID authentication 924. The authentication manager is communicably coupled with a common interface 926, which may be comprised of data encoders and decoders 928, encryption and decryption 930 and token management 932. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Figure 10:
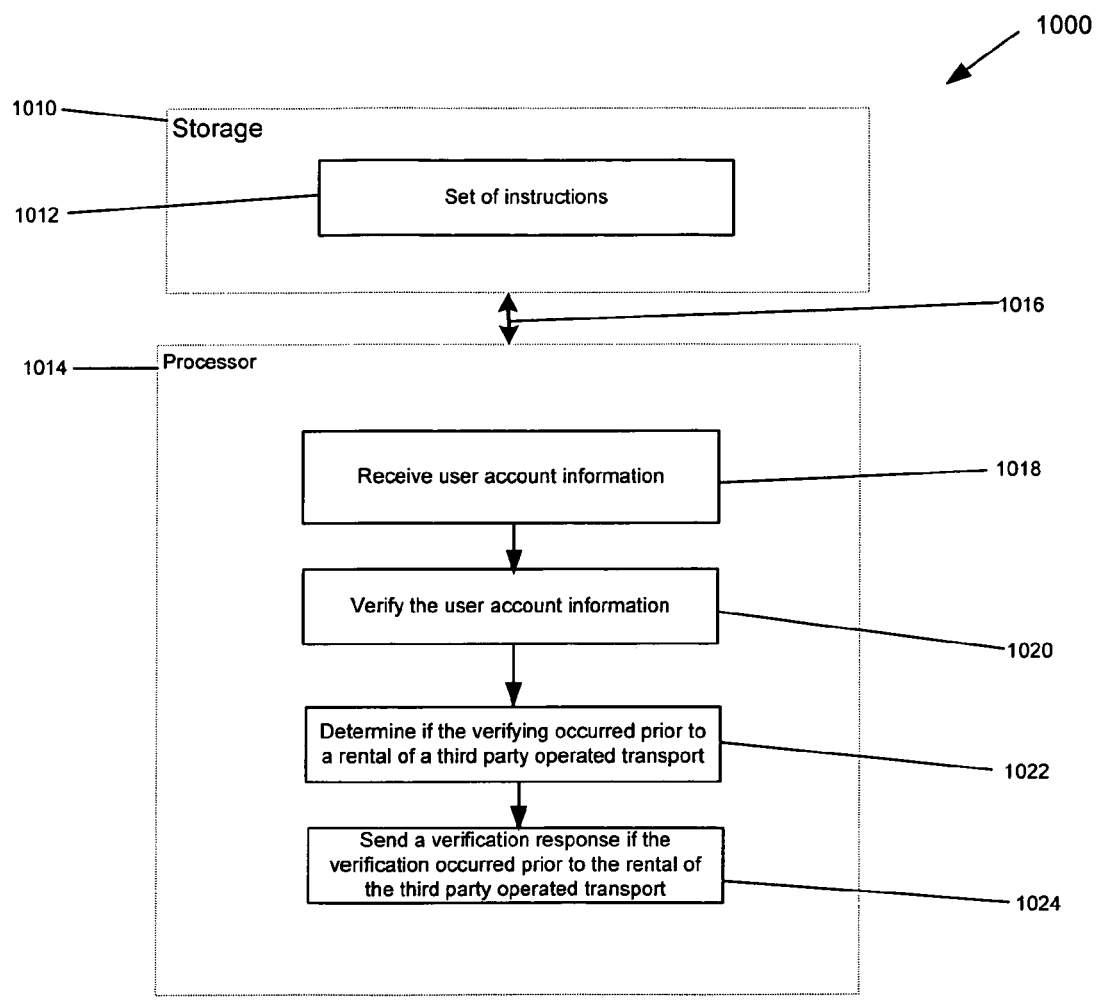
FIG. 10 illustrates a second toll account system of transferring toll data from a third party operated transport to a user account in accordance with an embodiment of the present invention.

Referring now to FIG. 10, a second toll account system of transferring toll data from a third party operated transport to a user account 1000 is depicted. A module, that comprises, at least one processor 1010, storage 1012 associated 1014 with the at least one processor, and a set of instructions 1016 in the storage, wherein the at least one processor executes the instructions to, receive 1018 user account information, verify 1020 the user account information, determine 1022 if the verifying occurred prior to a rental of a third party operated transport, and send 1024 a verification response if the verification occurred prior to the rental of the third party operated transport. The system processor may also encrypt the set of toll data and encode the set of toll data. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor and/or memory described herein form a circuit.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for transferring toll usage information from a third party operated transport to a transport operator's existing user account associated with a first toll authority, comprising:

transferring, from a computer associated with a third party entity via a computer associated with a toll rental entity, third party operated fleet data to a computer associated with a second toll authority;

receiving, by a computer associated with the toll rental entity, a service request and the transport operator's existing user account information from the computer associated with the third party entity;

receiving, by the computer associated with the toll rental entity, the toll usage information from the computer associated with the second toll authority;

determining, by the computer associated with the toll rental entity, if the service request matches the toll usage information;

responsive to a determination that the service request matches the toll usage information, transferring, from the computer associated with the toll rental entity to the computer associated with the second toll authority, the transport operator's existing user account information and the matched toll usage information; and charging, by the computer associated with the second toll authority, the transport operator's existing user account a fee for toll usage by the third party operated transport.

2. The method of claim 1, wherein the service request comprises:

rental information related to the third party operated transport;

an identifier of the transport operator's existing user account; and the transport operator's existing user account.

3. The method of claim 1 wherein the service request includes at least one of:

a rental agreement number for the third party operated transport;

a toll fee device identifier;
a start date of the service;
a start time of the service;
an end date of the service; and
an end time of the service.

4. The method of claim 2, wherein the identifier of the transport operator's existing user account includes at least one of:
a user's name;
the user's account number;
the user's transponder;
the user's address;
the user's driver license number;
the user's driver license state;
the user's credit card number;
the user's debit card number;
the user's electronic account number;
the user's insurance information;
the user's email address; and
the user's phone number.

5. The method of claim 2, wherein the rental information related to the third party operated transport includes at least one of:
an owner of the transport;
a user of the transport;
a license plate number of the transport;
a vehicle identification number of the transport;
a type of the transport;
a color of the transport;
a year of manufacture of the transport; and
a condition of the transport.

6. The method of claim 2, wherein the rental information related to the third party operated transport is related to at least one of:
a service period; and
a rental period.

7. The method of claim 6, wherein the service period is at least one of:
seconds, minutes, hours, days, months, and years.

8. The method of claim 6, wherein the rental period is at least one of:
a duration based transport rental service;
a pre-authorized transport rental service;
a pre-authorized, duration based transport rental service;
an unlimited transport rental service; and
a location based transport rental service.

9. The method of claim 1, wherein the transport operator's existing user account is related to the first toll authority.

10. The method of claim 1, wherein the toll usage information comprises at least one of:
a toll amount incurred by the third party operated transport;
a time the toll amount was incurred;
a toll location;
a toll date;
a direction of travel by the third party operated transport;
a location of the third party operated transport;
information related to the third party operated transport;
information related to a license plate of the third party operated transport;
a location of toll facility; and
a location of toll lane.

11. The method of claim 1 comprising:
responsive to a determination that the service request does not matches the toll usage information, sending, from the computer associated with the toll rental entity, a payment corresponding to unsubscribed toll usage to the computer associated with the second toll authority.

12. The method of claim 11 comprising:
collecting, by the computer associated with the toll rental entity, a fee corresponding to the unsubscribed toll usage via the computer associated with the third party entity.

13. The method of claim 11 comprising:
collecting, by the computer associated with the toll rental entity, a fee corresponding to the unsubscribed toll usage via an unsubscribed transport operator.

14. The method of claim 1, wherein the transport operator's existing user account is not related to the second toll authority.

15. The method of claim 1, further comprising performing, by the computer associated with the toll rental entity, a verification of the transport operator's existing user account.

16. The method of claim 15, wherein the verification of the transport operator's existing user account and the service request occur in at least one of:
parallel;
serially; and
in any order.

17. An article of manufacture for transferring toll usage information from a third party operated transport to a transport operator's existing user account associated with a first toll authority, the article of manufacture comprising:
at least one non-transitory computer readable medium;
processor instructions contained on the at least one non-transitory computer readable medium, the processor instructions configured to be readable from the at least one non-transitory computer readable medium by at least one processor and thereby cause the at least one processor to operate as to perform the following steps:
transferring third party operated fleet data to a second toll authority;
receiving a service request and the transport operator's existing user account information by a toll rental entity;
receiving the toll usage information by the toll rental entity;
determining via the toll rental entity whether the service request matches the toll usage information;
responsive to a determination that the service request matches the toll usage information, transferring, from the toll rental entity to the second toll authority, the transport operator's existing user account information and the matched toll usage information; and
charging, by the second toll authority, the transport operator's existing user account a fee for toll usage by the third party operated transport.

18. The article of manufacture of claim 17, wherein the processor instructions are configured to cause the at least one processor to operate as to perform the following steps:
responsive to a determination that the service request does not match the toll usage information, sending, from the toll rental entity, a payment corresponding to unsubscribed toll usage to the second toll authority.

19. The article of manufacture of claim 18, wherein the processor instructions are configured to cause the at least one processor to operate as to perform the following steps:
collecting a fee corresponding to the unsubscribed toll usage via the third party entity.

20. The article of manufacture of claim 18, wherein the processor instructions are configured to cause the at least one processor to operate as to perform the following steps:
collecting a fee corresponding to the unsubscribed toll usage via an unsubscribed transport operator.

21. The article of manufacture of claim 17, wherein the transport operator's existing user account is not related to the second toll authority.

22. A system for transferring toll usage information from a third party operated transport to a transport operator's existing user account associated with a first toll authority comprising:
- a third party computer operable to transfer third party operated fleet data to a second toll authority;
- a toll rental computer communicably coupled to the third party computer and the second toll authority and operable to receive a service request and the transport operator's existing account information;
- wherein the toll rental computer is operable to receive the toll usage information from the second toll authority and determine if the service request matches the toll usage information;
- responsive to a determination that the service request matches the toll usage information, the toll rental computer is operable to transfer the transport operator's existing user account information and the matched toll usage information to the second toll authority; and
- wherein the second toll authority is operable to charge the transport operator's existing user account a fee for toll usage by the third party operated transport.

\* \* \* \* \*